United States Patent
Wang et al.

(10) Patent No.: US 9,740,635 B2
(45) Date of Patent: Aug. 22, 2017

(54) COMPUTING METHOD AND APPARATUS ASSOCIATED WITH CONTEXT-AWARE MANAGEMENT OF A FILE CACHE

(71) Applicant: Intel Corporation, Santa Clara, CA (US)

(72) Inventors: Ren Wang, Portland, OR (US);
Weishuang Zhao, Pittsburgh, PA (US);
Wei Shen, Hillsboro, OR (US);
Michael P. Mesnier, Scappoose, OR (US); Tsung-Yuan C. Tai, Portland, OR (US); Mesut A. Ergin, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 14/656,453

(22) Filed: Mar. 12, 2015

(65) Prior Publication Data
US 2016/0267020 A1    Sep. 15, 2016

(51) Int. Cl.
*G06F 12/12*        (2016.01)
*G06F 12/123*      (2016.01)
(Continued)

(52) U.S. Cl.
CPC ........ *G06F 12/123* (2013.01); *G06F 12/0866* (2013.01); *G06F 12/0891* (2013.01)

(58) Field of Classification Search
CPC .... G06F 12/123; G06F 12/12; G06F 12/0866; G06F 12/08; G06F 12/0891; G06F 2212/69; G06F 2212/00
See application file for complete search history.

(56) References Cited

U.S. PATENT DOCUMENTS

2002/0083183 A1* 6/2002 Pujare .................. G06F 8/65
709/231
2007/0113014 A1   5/2007 Manolov et al.
(Continued)

FOREIGN PATENT DOCUMENTS

WO    WO2006-071792 A2    7/2006

OTHER PUBLICATIONS

Exponential Moving Average (EMA) Explained, http://www.babypips.com/school/elementary/moving-averages/exponential-moving-average.html, Feb. 20, 2015, 4 pages.
(Continued)

*Primary Examiner* — David X Yi
*Assistant Examiner* — Zubair Ahmed
(74) *Attorney, Agent, or Firm* — Schwabe, Williamson & Wyatt, P.C.

(57) ABSTRACT

Computer-readable storage media, computing devices and methods associated with file cache management are discussed herein. In embodiments, a computing device may include a file cache and a file cache manager coupled with the file cache. The file cache manager may be configured to implement a context-aware eviction policy to identify a candidate file for deletion from the file cache, from a plurality of individual files contained within the file cache, based at least in part on file-level context information associated with the individual files. In embodiments, the file-level context information may include an indication of access recency and access frequency associated with the individual files. In such embodiments, identifying the candidate file for deletion from the file cache may be based, at least in part, on both the access recency and the access frequency of the individual files. Other embodiments may be described and/or claimed.

19 Claims, 4 Drawing Sheets

(51) Int. Cl.
*G06F 12/0891* (2016.01)
*G06F 12/0866* (2016.01)

(56) References Cited

U.S. PATENT DOCUMENTS

| | | |
|---|---|---|
| 2009/0100224 A1 | 4/2009 | Wang |
| 2012/0210068 A1 | 8/2012 | Joshi et al. |
| 2014/0337458 A1 | 11/2014 | Barton |
| 2015/0134913 A1* | 5/2015 | Huang ................ G06F 12/0833 |
| | | 711/135 |
| 2015/0254249 A1* | 9/2015 | Mosko ................ G06F 17/3053 |
| | | 707/751 |

OTHER PUBLICATIONS

David A. Holland et al., "Flash Caching on the Storage Client", 2013 USENIX Annual Technical Conference (USENIX ATC '13), 2013, 12 pages.
Nimrod Megiddo et al., "Outperforming LRU with an Adaptive Replacement Cache Algorithm", IBM Almaden Research Center, IEEE Computer Society, Apr. 2004, 8 pages.
International Search Report and Written Opinion mailed Jun. 13, 2016 for International Application No. PCT/US2016/014945, 16 pages.

* cited by examiner

COMPUTING METHOD AND APPARATUS ASSOCIATED WITH CONTEXT-AWARE MANAGEMENT OF A FILE CACHE

TECHNICAL FIELD

Embodiments of the present disclosure are related to the field of cache management, and in particular, to context-aware management of a file cache.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Cloud storage is rapidly gaining popularity in recent years due to its manageability, convenience, and scalability. Accessing files from the remote cloud, especially when over slow wireless links, however, may incur long latency which may negatively impact users' experiences.

Caching the cloud storage content in a storage disk (for example a local hard drive) of a local client is one method of combatting network latency. Under the current state of the art, cloud storage services may employ relatively naïve methods for caching cloud content. An example of one such method is the "mirror" approach, used by a majority of cloud storage services (e.g., GoogleDrive, etc.). With this approach all cloud content may be cached, or "mirrored," on the local disk. Because of this, the mirror approach may only be practical when cloud storage capacity is smaller than local storage. A second example of such a naïve method involves manual selection of important files that should be cached on the local disk (e.g., "offline files" method of GoogleDrive). This approach is also designed to deal with offline case when network connection is not available or is experiencing delays from network latency. Cloud storage, however, is becoming larger and larger making these naïve approaches impractical.

DETAILED DESCRIPTION OF ILLUSTRATIVE EMBODIMENTS

Methods, computer-readable media, and computing devices associated with context-aware management of a file cache are described herein. In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
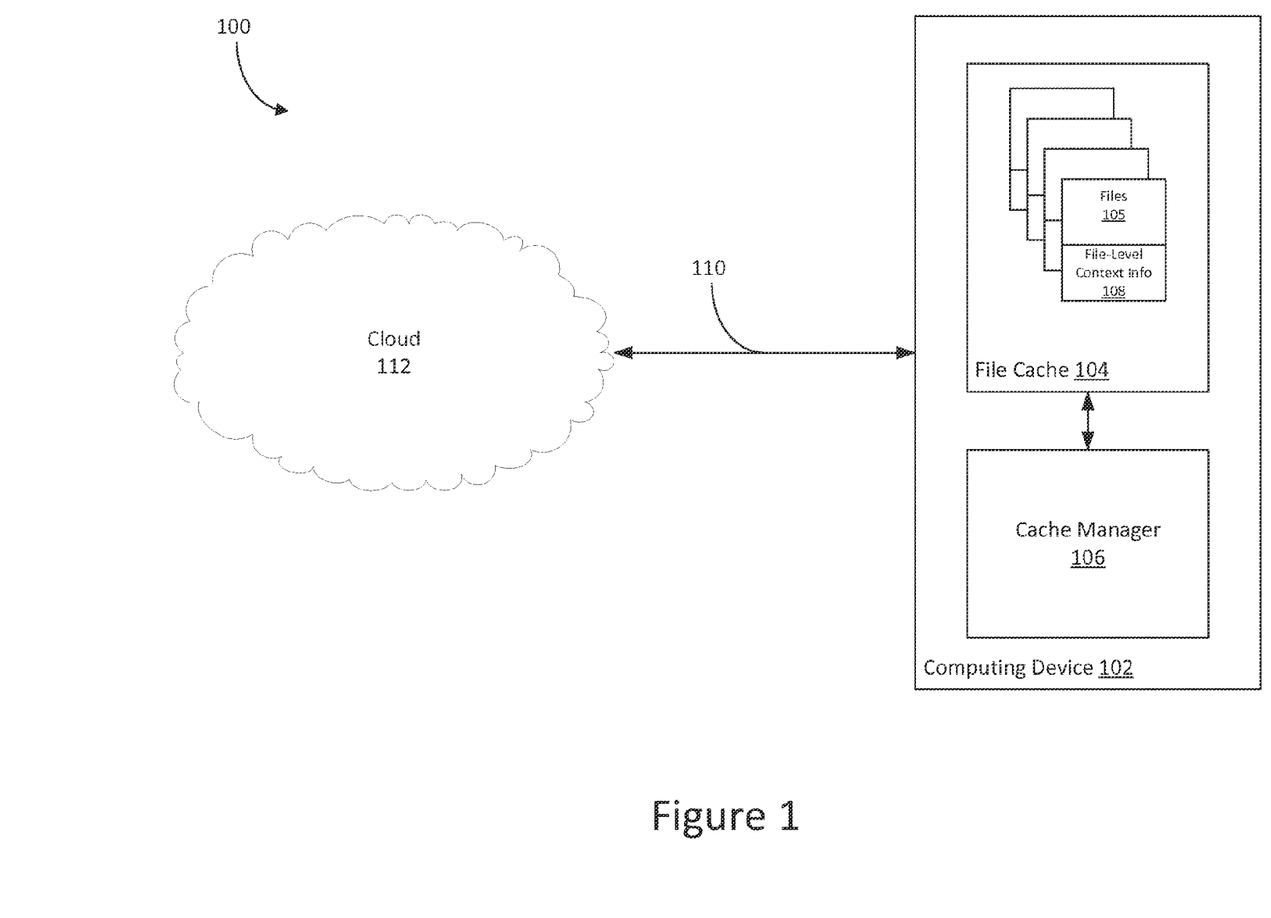
FIG. 1 depicts an example computing environment in which a file cache manager that implements a context-aware eviction policy may be implemented, in accordance with various embodiments of the present disclosure.

FIG. 1 depicts an example computing environment 100 in which a file cache manager 106 that implements a context-aware eviction policy may be practiced in accordance with various embodiments of the present disclosure. In embodiments, computing environment 100 may include a computing device 102 and a computing cloud 112, hereinafter referred to simply as cloud 112. Computing device 102 may include a file cache 104, and file cache manager 106 coupled with file cache 104 to manage file cache 104. File cache 104 may be configured to store local copies of files that have been recently accessed from one or more file repositories (e.g., cloud 112) by one or more applications on computing device 102 or client devices (not shown) serviced by computing device 102. In embodiments, file cache 104 may provide faster or more efficient access to the files 105 stored within the file cache than would be achievable by accessing the file from the repository. For example, as depicted, cloud 112 and computing device 102 may be coupled with one another by way of a network connection 110. Network connection 110 may represent any wired or wireless wide area network or any combination thereof. Because computing device 102 may need to retrieve files not stored locally in file cache 104 from cloud 112, the retrieval of any files from cloud 112 may be impacted by latency of network 110, or any components thereof, and/or latency of cloud 112 in processing requests for the files. Examples of client devices (not shown) may be client devices coupled with computing device 102 via a local or personal network. These client devices may include, but are not limited to, tablets, smartphones, or various wearable devices.

Because the storage capacity of cloud 112 may be larger than the storage capacity of file cache 104, only a selection of files (e.g., files 105) may be able to be stored, or cached, in file cache 104. As a result, occasionally, one or more of files 105 may need to be evicted or deleted, to make room for a new file that may need to be cached with files 105. Because of this, file cache manager 106 may be configured to evict, or delete, one or more of files 105, in response to a determination that file cache 104 has reached a threshold of available capacity. Such a threshold may be reached by the addition of one or more files to file cache 104 or through a reduction of capacity allocated to file cache 104. To accomplish this, file cache manager 106 may be configured to automatically evict, or delete, one or more of files 105 to make room in file cache 104 for the new file or account for the reduction in capacity. In evicting a file from file cache 104, it is important to keep, if possible, those files that have a higher likelihood of being accessed in an effort to ensure that any latency in file accesses is reduced or minimized. As such, file cache manager 106 may be configured to implement a context-aware eviction policy, such as that depicted by process flow 200 of FIG. 2, to identify a candidate file for deletion from file cache. Such a process flow may enable automatic identification of a candidate file based on file-level context information 108 associated with the individual files, as opposed to block-level or object-level context information which may lose important and useful file-level information. As used herein, automatic may refer to a process or procedure carried out autonomously, or without human intervention.

In embodiments, file-level context information 108 may include an indication of access recency and/or access frequency associated with the individual files of files 105. In such embodiments, file cache manager 106 may automatically identify a candidate file for deletion, or eviction, from file cache 104 based, at least in part, on the access recency and/or the access frequency of the individual files. Taking into account recency of file access may be beneficial as the most recently accessed files might be accessed again in a relatively short amount of time. Taking into account access frequency may be beneficial by reducing the weight given to a recently accessed file that has only ever been accessed a relatively small number of times, thereby giving the files that are accessed more frequently more weight in determining the candidate for eviction.

In some embodiments, the access recency and access frequency may be indicated by a frequency-recency value (FRV) associated with the individual files. Such a value may be based on any formula taking into account both recency and frequency. For example, in some embodiments, the FRV may be calculated as a weighted exponentially moving average (WEMA). Such a WEMA may be represented, for example, by the equation $$FRV_k = \alpha * FRV_{k-1} + (1-\alpha) * sample,$$

where $FRV_k$ may represent a current, or new, FRV;
$FRV_{k-1}$ may represent an immediately preceding FRV;
$\alpha$ may represent a degree of weighting decrease to be applied to discount older observations; and
sample may be utilized to take into account access recency.

For example, sample may represent a value of 1 for an individual file that is currently accessed or −1 for an individual file that is not currently accessed. The weighting decrease for $\alpha$ may be, for example, a value chosen between 0 and 1, where a higher value for $\alpha$ may discount older observations faster. By doing this, the current sample (represented as recency) is smoothed overtime, while the WEMA gives more weight to recent samples. Thus both frequency and recency information may be captured by this equation. It will be appreciated there are a multitude of ways in which the recency and frequency may be captured and that the above example is meant to be illustrative only.

In some embodiments, file-level context information 108 may include an indication of application-level relationships between files 105. In such embodiments, file cache manager 106 may be configured to identify the candidate file for deletion from the file cache based on these application-level relationships. For example, in some embodiments, these application level relationships may be generated from file access traces that indicate a sequence, or pattern, in which individual files are accessed based on execution of an application. In such embodiments, file cache manager 106 may be configured to eliminate for consideration those individual files that are indicated, by such a file access pattern, as being accessed after an individual file that was recently accessed by the application.

In some embodiments, for example, file cache manager 106 may be configured to observe file access patterns during execution of the application, and may be further configured to generate the application-level relationships between the individual files based at least in part on the observed file access patterns. These application level relationships may be maintained in file level context info 108 or may be stored in a central repository, such as one or more of the mass storage devices discussed below in reference to FIG. 3. In other embodiments, the application-level relationships may be maintained in a database in cloud 112, in such embodiments, file access patterns may be generated by one or more other computing devices of cloud 112 that are configured to observe file access patterns during execution of the application, and generate the application-level relationships between the individual files based at least in part on the observed file access patterns.

In some embodiments, the file-level context information 108 may include an indication of file size of the individual files. In such embodiments file cache manager 106 may be configured to identify the candidate file for deletion from file cache 104 based on the respective file sizes of files 105. For example, file cache manager 106 may be configured to assign a smaller weight to a file with a relatively large size in an effort to increase or maximize the number of files that may be able to be stored in file cache 104. In such an example, a file with a relatively smaller size may be assigned a correspondingly greater weight.

In some embodiments, the file-level context information may include an indication of user preference of the individual files. For example, in some embodiments, the user may select one or more files that the user regularly accesses in an effort to ensure that these one or more files are cached and thereby quickly accessible. In, other embodiments, the user may assign weights, or priorities, to the files for the file cache manager to take into account when identifying the candidate file for eviction. In such embodiments, the file cache manager may be configured to identify the candidate file for deletion from the file cache based on the user preference of the individual files.

In some embodiments, file-level context information 108 may include, any combination of the above discussed file-level context information. Such other file-level context information. While depicted here as a cloud storage cache, it will be appreciated that file cache 104 may be any suitable type of file cache including, but not limited to a disk cache, web cache, etc.

Figure 2:
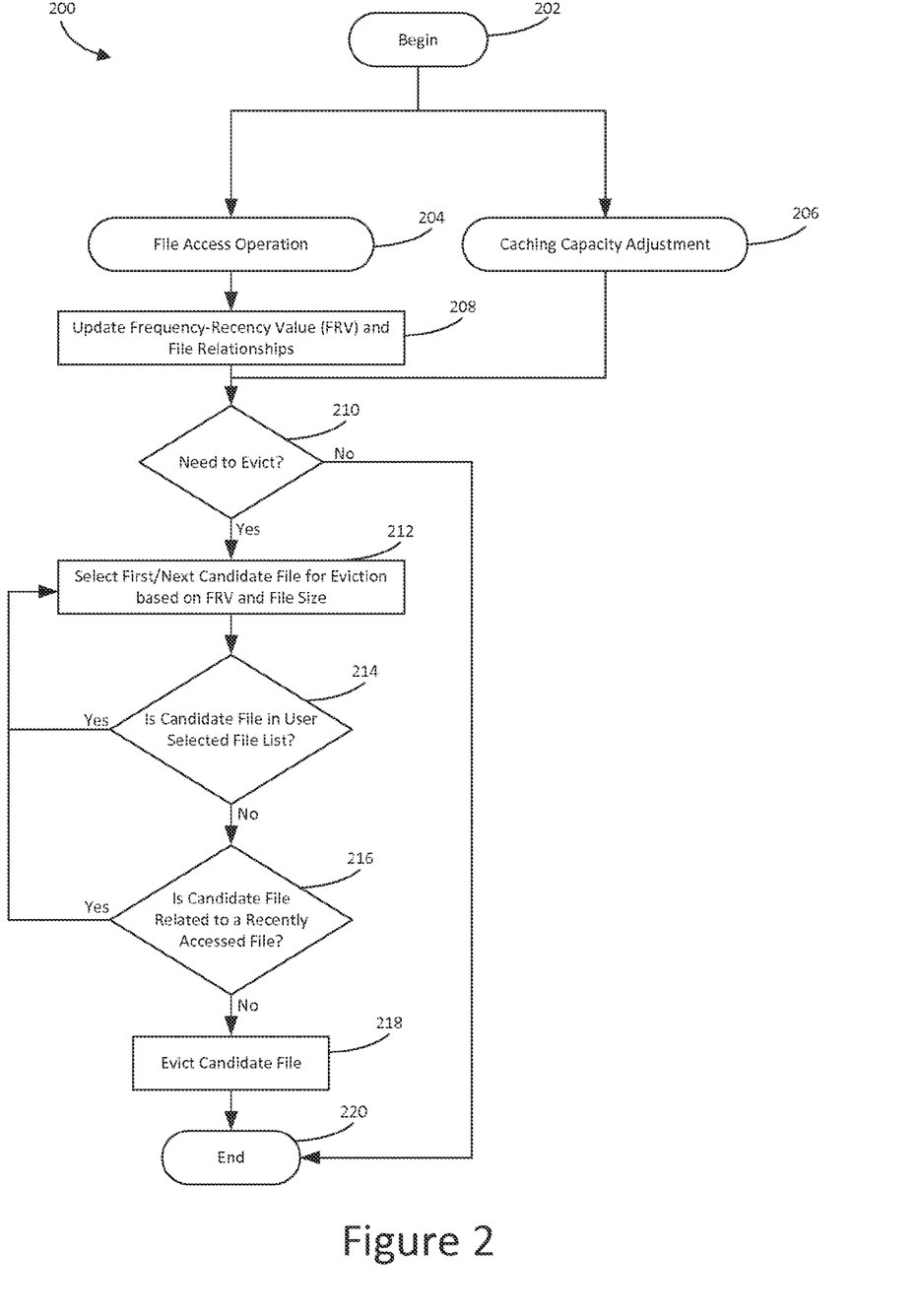
FIG. 2 illustrates an example process flow for a computer-implemented context-aware eviction policy based file cache management, in accordance with various embodiments of the present disclosure.

FIG. 2 illustrates an example process flow 200 for a computer-implemented context-aware eviction policy based file cache management, in accordance with various embodiments of the present disclosure. Process flow 200 may begin at block 202, after which either a file access operation 204 or a caching capacity adjustment 206 may be detected by a cache manager (e.g., file cache manager 106) of a file cache. As depicted, in the event that a file access operation 204 is detected, a frequency-recency value (FRV) for each file of an associated file cache, such as that discussed in greater detail above in reference to FIG. 1, may be updated, by the file cache manager, at block 208. In addition, in embodiments where file access patterns are observed and generated by a file cache manager, any application-level file relationships may be updated by the file cache manager at block 208.

At block 210 a determination may be made by the file cache manager as to whether one or more files need to be evicted. Such a determination may be made based upon whether a file cache has reached a threshold of capacity by the addition of one or more files to the file cache or through a reduction of capacity allocated to the file cache. If the file cache has not reached such a threshold of capacity, process flow 200 may continue to block 220, where the process may end. If, on the other hand, the file cache has reached such a threshold of capacity, the process may proceed to block 212. At block 212, an initial or next candidate file for eviction may be selected based upon a combination of the respective FRVs and file sizes of the individual files. As discussed above, in reference to FIG. 1, the file size may be taken into account by applying a weight, or priority, to the individual files based on the respective file size and an initial candidate file may be selected based upon this weight. For example, the file cache manager may assign a smaller weight to a file with a relatively large size in an effort to increase or maximize the number of files that may be able to be stored in the file cache. In such an example, a file with a relatively smaller size may be assigned a correspondingly greater weight. As such, in this example, a file with a relatively larger size, but a relatively high FRV may be selected as an initial or next candidate for eviction, based on the combination of the file size and FRV, while a relatively smaller file with a lower FRV may not.

Once an initial or next candidate file is selected at block 212, the process may proceed to block 214, where a determination may be made as to whether the candidate file is included in a user selected file list. If the file is in a user selected file list, the process may proceed to block 212 where a next candidate file may be selected. If the file is not in the user selected file list, the process may proceed to block 216. It will be appreciated that the user selected file list is merely an example mechanism by which a user preference may be implemented, other methods may be utilized, such as those discussed above in reference to FIG. 1. For example, in embodiments where the user has assigned a priority value to the files, the priority value may be considered in conjunction with the FRV and file size at block 212, or may be separately considered at block 214.

At block 216, a determination may be made as to whether the candidate file is closely related to a recently accessed file. As used here, a closely related file may be a file that is generally accessed, at least according to file access patterns of an application, in synchronization with an access to the candidate file. If the candidate file is closely related to a recently accessed file, the process may proceed to block 212 where a next candidate file may be selected. If the file is not closely related to a recently accessed file, the process may proceed to block 218, where the candidate file may be evicted from the file cache by the file cache manager. Finally, at block 220, the process may end.

Figure 3:
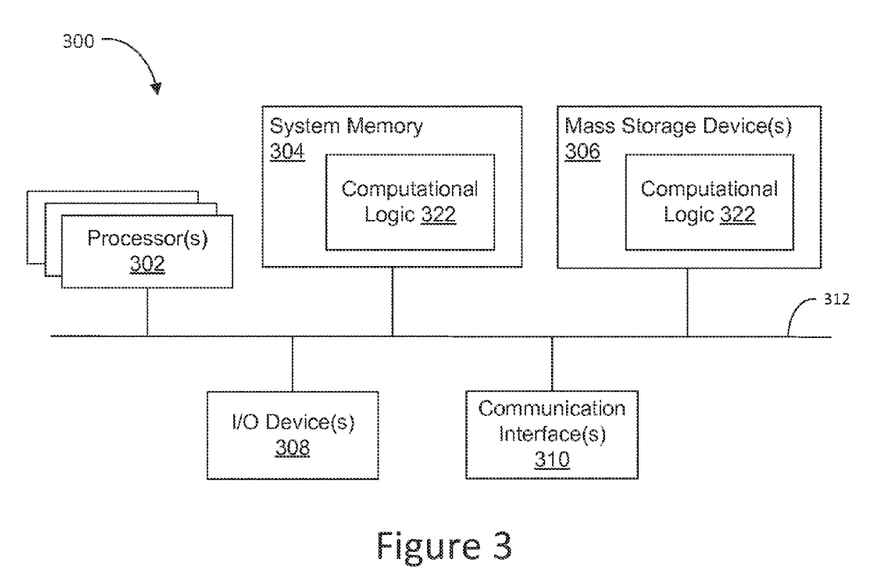
FIG. 3 is a schematic illustration of an example computing device, in accordance with various embodiments of the present disclosure.

Referring now to FIG. 3, wherein an example computing device suitable to implement any of the computing devices discussed herein, in accordance with various embodiments, is illustrated. As shown, computing device 300 may include one or more processors or processor cores 302, and system memory 304. In embodiments, multiple processor cores 302 may be disposed on one die. For the purpose of this application, including the claims, the terms "processor" and "processor cores" may be considered synonymous, unless the context clearly requires otherwise. Additionally, computing device 300 may include mass storage device(s) 306 (such as flash drive, diskette, hard drive, compact disc read-only memory (CD-ROM), and so forth), input/output (I/O) device(s) 308 (such as camera, display device, keyboard, cursor control, gyroscope, accelerometer, and so forth), and communication interfaces 310 (such as network interface cards, modems, and so forth). In embodiments, a display device may be touch screen sensitive and may include a display screen, one or more processors, storage medium, and communication elements. Further, it may be removably docked or undocked from a base platform having the keyboard. The elements may be coupled to each other via system bus 312, which may represent one or more buses. In the case of multiple buses, the buses may be bridged by one or more bus bridges (not shown).

Each of these elements may perform its conventional functions known in the art. In particular, system memory 304 and mass storage device(s) 306 may be employed to store a working copy and a permanent copy of programming instructions implementing the operations described earlier (e.g., but not limited to, operations associated with file cache manager 106 of FIG. 1 or the context-aware eviction policy depicted by process flow 200 of FIG. 2) generally referred to as computational logic 322, or to store a file cache, such as file cache 104 of FIG. 1. The various operations may be implemented by assembler instructions supported by processor(s) 302 or high-level languages, such as, for example, C, that may be compiled into such instructions.

The permanent copy of the programming instructions may be placed into permanent mass storage device(s) 306 in the factory, or in the field, through, for example, a distribution medium (not shown), such as a compact disc (CD), or through communication interface 310 (from a distribution server (not shown)). That is, one or more distribution media having an implementation of any of the operations described earlier may be employed to distribute these components to various computing devices.

The number, capability, and/or capacity of these elements 302-312 may vary, depending on the intended use of example computing device 300, e.g., whether example computer 300 is a smartphone, tablet, ultrabook, laptop, desktop, server, etc. The constitutions of these elements 310-312 are otherwise known, and accordingly will not be further described.

Figure 4:
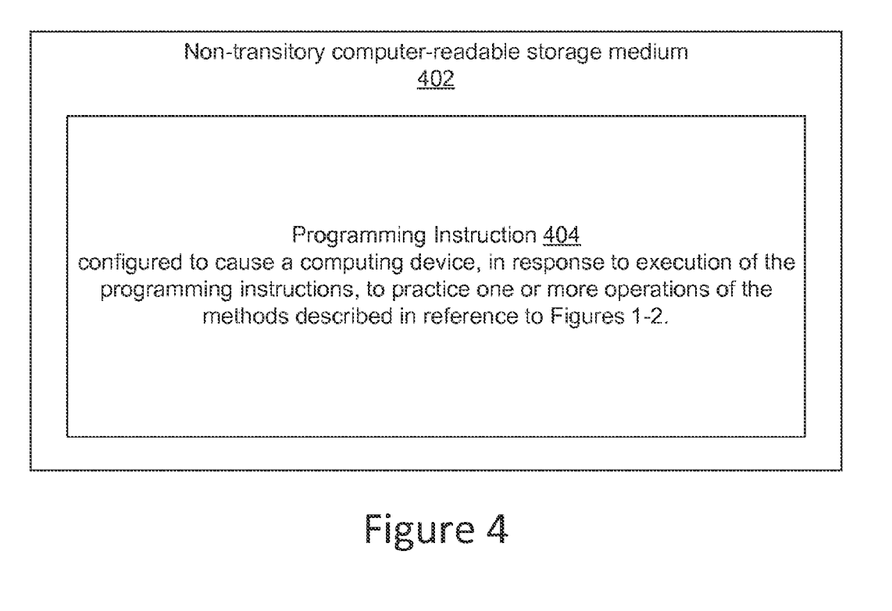
FIG. 4 illustrates an example non-transitory computer-readable storage medium having instructions configured to practice all or selected ones of the operations associated with the processes described above.

FIG. 4 illustrates an example non-transitory computer-readable storage medium having instructions configured to practice all or selected ones of the operations associated with the processes described above. As illustrated, non-transitory computer-readable storage medium 402 may include a number of programming instructions 404. Programming instructions 404 may be configured to enable a device, e.g., computing device 400, in response to execution of the programming instructions, to perform one or more operations of the processes described in reference to FIGS. 1-2, in particular, the operations associated with file cache manager 106 for managing file cache 104. In alternate embodiments, programming instructions 404 may be disposed on multiple non-transitory computer-readable storage media 402 instead. In still other embodiments, programming instructions 404 may be encoded in transitory computer-readable signals.

Referring back to FIG. 3, for one embodiment, at least one of processors 302 may be packaged together with memory having computational logic 322 (in lieu of storing in mass storage device(s) 306) configured to perform one or more operations of the processes described with reference to FIGS. 1-2. For one embodiment, at least one of processors 302 may be packaged together with memory having computational logic 322 configured to practice aspects of the methods described in reference to FIGS. 1-2 to form a System in Package (SiP). For one embodiment, at least one of processors 302 may be integrated on the same die with memory having computational logic 322 configured to perform one or more operations of the processes described in reference to FIGS. 1-2. For one embodiment, at least one of processors 302 may be packaged together with memory having computational logic 322 configured to perform one or more operations of the process described in reference to FIGS. 1-2 to form a System on Chip (SoC). Such a SoC may be utilized in any suitable computing device.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Some non-limiting examples are:

Example 1 may be a computing device comprising: a file cache; and a file cache manager coupled with the file cache. The file cache manager may be configured to implement a context-aware eviction policy to identify a candidate file for deletion from the file cache, from a plurality of individual files contained within the file cache, based at least in part on file-level context information associated with the individual files. The file-level context information may include an indication of access recency and access frequency associated with the individual files, and identify the candidate file for deletion from the file cache may be based, at least in part, on both the access recency and the access frequency of the individual files.

Example 2 may be example 1, wherein the file cache manager may be configured to use a frequency-recency value (FRV) associated with each individual file to determine access recency and access frequency, wherein the file cache manager may be configured to calculate the FRV as a weighted exponentially moving average (WEMA) represented by the equation $$FRV_{NEW} = \alpha * FRV_{OLD} + (1-\alpha) * \text{sample},$$

where $FRV_{NEW}$ represents a new FRV,
$FRV_{OLD}$ represents an immediately preceding FRV,
α represents a weighting decrease between 0 and 1, and
sample represents a value of 1 for an individual file that is currently accessed or −1 for an individual file that is not currently accessed.

Example 3 may be example 1, wherein the file-level context information may further include an indication of application-level relationships between the individual files, and the file cache manager may be further configured to identify the candidate file for deletion from the file cache based at least in part on the application-level relationships.

Example 4 may be example 3, wherein the file cache manager may be further configured to observe file access patterns during execution of one or more applications; and generate the application-level relationships between the individual files based at least in part on the observed file access patterns.

Example 5 may be example 3, wherein the application-level context information may include a file access pattern of an application under execution on the computing device, and to identify a candidate file for deletion from the file cache, based at least in part on the application-level relationships, the file cache manager may be further configured to eliminate for consideration those individual files that are indicated, by the file access pattern, as being accessed after an individual file that was recently accessed by the application.

Example 6 may be example 1, wherein the file-level context information may be further configured to include an indication of file size of the individual files, and wherein the file cache manager may be further configured to identify the candidate file for deletion from the file cache based at least in part on the respective file sizes of the individual files.

Example 7 may be example 1, wherein the file-level context information may further include an indication of user preference of the individual files, and the file cache manager may be further configured to identify the candidate file for deletion from the file cache based at least in part on the user preference of the individual files.

Example 8 may be any one of examples 1-7, wherein the file cache manager may be further configured to implement the context-aware eviction policy in response to a determination that the file cache has reached a threshold of available capacity.

Example 9 may be example 8, wherein the file cache is one of: a disk cache; a web cache; or a cloud storage cache.

Example 10 may be a computer-implemented method comprising: determining, by a file cache manager, that a file cache of a computing device has reached a threshold of available capacity; and implementing, by the file cache manager, in response to the determining, a context-aware eviction policy to identify a candidate file for deletion from the file cache based at least in part on file-level context information associated with individual files contained within the cache, wherein the file-level context information includes an indication of application-level relationships between the individual files, and wherein to identify a candidate file for deletion from the file cache is based at least in part further on the application-level relationships of the individual files.

Example 11 may be example 10, wherein the file-level context information may include an indication of access recency and access frequency associated with the individual files, and identifying the candidate file for deletion from the file cache may be based, at least in part, on both the access recency and the access frequency of the individual files.

Example 12 may be example 11, wherein implementing may include computing a frequency-recency value (FRV) associated with each individual file to indicate access recency and access frequency, wherein calculating FRV may include calculating a weighted exponentially moving average (WEMA) represented by the equation:

$$FRV_{NEW}=\alpha*FRV_{OLD}+(1-\alpha)*sample,$$

where $FRV_{NEW}$ represents a new FRV,
$FRV_{OLD}$ represents an immediately preceding FRV,
$\alpha$ represents a weighting decrease between 0 and 1, and
sample represents a value of 1 for an individual file that is currently accessed or –1 for an individual file that is not currently accessed.

Example 13 may be example 11, further comprising: observing, by the file cache manager, file access patterns during execution of one or more applications; and generating the application-level relationships between the individual files based at least in part on the observed file access patterns.

Example 14 may be example 12, wherein the application-level context information may include a file access pattern of an application under execution on the computing device, and wherein identifying a candidate file for deletion from the file cache, based at least in part on the application-level relationships, may further include eliminating for consideration those individual files that are indicated, by the file access pattern, as being accessed after an individual file that was recently accessed by the application.

Example 15 may be example 10, wherein the file-level context information may further include an indication of file size of the individual files, and wherein identifying the candidate file for deletion from the file cache may be based at least in part on the respective file sizes of the individual files.

Example 16 may be any one of examples 10-15, wherein the file-level context information may further include an indication of user preference of the individual files, and wherein identifying the candidate file for deletion from the file cache may be based at least in part on the user preference of the individual files.

Example 17 may be example 16, wherein the file cache is one of: a disk cache; a web cache; or a cloud storage cache.

Example 18 may be one or more computer-readable media having instructions stored thereon which, in response to execution by a computing device, provide the computing device with a file cache manager to: determine that a file cache of the computing device has reached a threshold of available capacity; and implement, in response to the determine, a context-aware eviction policy to identify a candidate file for deletion from the file cache based at least in part on file-level context information associated with individual files contained within the cache, wherein the file-level context information includes an indication of access recency and access frequency associated with the individual files, and wherein to identify the candidate file for deletion from the file cache is based, at least in part, on both the access recency and the access frequency of the individual files.

Example 19 may be example 18, wherein to implement may include to calculate a frequency-recency value (FRV) associated with each individual file to indicate access recency and access frequency, wherein to calculate may include to calculate the FRV as a weighted exponentially moving average (WEMA) represented by the equation:

$$FRV_{NEW}=\alpha*FRV_{OLD}+(1-\alpha)*sample,$$

where $FRV_{NEW}$ represents a new FRV,
$FRV_{OLD}$ represents an immediately preceding FRV,
$\alpha$ represents a weighting decrease between 0 and 1, and
sample represents a value of 1 for an individual file that is currently accessed or –1 for an individual file that is not currently accessed.

Example 20 may be example 18, wherein the file-level context information may further include an indication of application-level relationships between the individual files, and wherein the file cache manager may be further configured to identify the candidate file for deletion from the file cache based at least in part on the application-level relationships.

Example 21 may be example 20, wherein the file cache manager may be further configured to observe file access patterns during execution of one or more applications; and generate the application-level relationships between the individual files based at least in part on the observed file access patterns.

Example 22 may be example 20, wherein the application-level context information may further include a file access pattern of an application under execution on the computing device, and wherein to identify a candidate file for deletion from the file cache, based at least in part on the application-level relationships, the file cache manager may be further configured to eliminate for consideration those individual files that are indicated, by the file access pattern, as being accessed after an individual file that was recently accessed by the application. \

Example 23 may be example 18, wherein the file-level context information may further include an indication of file size of the individual files, and wherein the file cache manager may be further configured to identify the candidate file for deletion from the file cache based at least in part on the respective file sizes of the individual files.

Example 24 may be any one of examples 18-23, wherein the file-level context information may further include an indication of user preference of the individual files, and wherein the file cache manager may be further configured to identify the candidate file for deletion from the file cache based at least in part on the user preference of the individual files.

Example 25 may be example 24, wherein the file cache is one of: a disk cache; a web cache; or a cloud storage cache.

Example 26 may be a computing device comprising: means for determining that a file cache of a computing device has reached a threshold of available capacity; and means for implementing, in response to the determining, a context-aware eviction policy to identify a candidate file for deletion from the file cache based at least in part on file-level context information associated with individual files contained within the cache, wherein the file-level context information includes an indication of application-level relationships between the individual files, and wherein means for implementing includes means for identifying a candidate file for deletion from the file cache is based at least in part further on the application-level relationships of the individual files.

Example 27 may be example 26, wherein the file-level context information may include an indication of access recency and access frequency associated with the individual files, and wherein means for identifying may comprise means for identifying the candidate file for deletion from the file cache is based, at least in part, on both the access recency and the access frequency of the individual files.

Example 28 may be example 27, wherein means for identifying may comprise means for calculating a frequency-recency value (FRV) associated with each individual file to indicate access recency and access frequency, wherein the FRV may be calculated as a weighted exponentially moving average (WEMA) represented by the equation:

$$FRV_{NEW}=\alpha*FRV_{OLD}+(1-\alpha)*sample,$$

where $FRV_{NEW}$ represents a new FRV,
$FRV_{OLD}$ represents an immediately preceding FRV,
$\alpha$ represents a weighting decrease between 0 and 1, and
sample represents a value of 1 for an individual file that is currently accessed or −1 for an individual file that is not currently accessed.

Example 29 may be example 26, further comprising: means for observing file access patterns during execution of one or more applications; and means for generating the application-level relationships between the individual files based at least in part on the observed file access patterns.

Example 30 may be example 29, wherein the application-level context information may include a file access pattern of an application under execution on the computing device, and wherein means for identifying a candidate file for deletion from the file cache, based at least in part on the application-level relationships, may further include means for eliminating for consideration those individual files that are indicated, by the file access pattern, as being accessed after an individual file that was recently accessed by the application.

Example 31 may be example 26, wherein the file-level context information may further include an indication of file size of the individual files, and wherein means for identifying may comprise means for identifying the candidate file for deletion from the file cache, based at least in part on the respective file sizes of the individual files.

Example 32 may be any one of examples 26-31, wherein the file-level context information may further include an indication of user preference of the individual files, and wherein means for identifying may comprise means for identifying the candidate file for deletion from the file cache, based at least in part on the user preference of the individual files.

Example 33 may be example 32, wherein the file cache is one of: a disk cache; a web cache; or a cloud storage cache.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A computing device comprising:
   a file cache; and
   a file cache manager coupled with the file cache, to implement a context-aware eviction policy to identify a candidate file for deletion from the file cache, from a plurality of individual files contained within the file cache, based at least in part on file-level context information associated with the individual files, wherein the file-level context information includes an indication of access recency and access frequency associated with the individual files, and wherein to identify the candidate file for deletion from the file cache is based, at least in part, on both the indication of access recency and the indication of access frequency of the individual files;
   wherein the file-level context information further includes an indication of application-level relationships between the individual files, including a file access pattern of an application under execution on the computing device;
   wherein the file cache manager is further to identify the candidate file for deletion from the file cache based at least in part on the indication of application-level relationships; and
   wherein to identify a candidate file for deletion from the file cache, based at least in part on the indication of application-level relationships, the file cache manager is further to eliminate for consideration those individual files that are indicated, by the file access pattern, as being accessed after an individual file that was recently accessed by the application.

2. The computing device of claim 1, wherein the file cache manager is to use a frequency-recency value (FRV) associated with each individual file to determine access recency and access frequency, wherein the file cache manager is to calculate the FRV as a weighted exponentially moving average (WEMA) represented by an equation:

$$FRV_k=\alpha*FRV_{k-1}+(1-\alpha)*sample$$

where $FRV_k$ represents a new FRV,
$FRV_{k-1}$ represents an immediately preceding FRV,
$\alpha$ represents a weighting decrease value between 0 and 1, and
sample represents a value of 1 for an individual file of the file cache that is currently accessed or −1 for an individual file of the file cache that is not currently accessed.

3. The computing device of device of claim 1, wherein the file cache manager is further to observe file access patterns during execution of one or more applications; and generate the indication of application-level relationships between the individual files based at least in part on the observed file access patterns.

4. The computing device of claim 1, wherein the file-level context information further includes an indication of file size of the individual files, and wherein the file cache manager is further to identify the candidate file for deletion from the file cache based at least in part on the respective file sizes of the individual files.

5. The computing device of claim 1, wherein the file-level context information further includes an indication of user preference of the individual files, and wherein the file cache manager is further to identify the candidate file for deletion from the file cache based at least in part on the indication of user preference of the individual files.

6. The computing device of claim 1, wherein the file cache manager is to implement the context-aware eviction policy in response to a determination that the file cache has reached a threshold of available capacity.

7. The computing device of claim 1, wherein the file cache is one of:
a disk cache;
a web cache; or
a cloud storage cache.

8. A computer-implemented method comprising:
determining, by a file cache manager of a computing device, that a file cache of the computing device has reached a threshold of available capacity; and
implementing, by the file cache manager, in response to the determining, a context-aware eviction policy to identify a candidate file for deletion from the file cache based at least in part on file-level context information associated with individual files contained within the cache, wherein the file-level context information includes an indication of application-level relationships between the individual files, and wherein to identify a candidate file for deletion from the file cache is based at least in part further on the indication of application-level relationships of the individual files;
wherein the file-level context information includes an indication of access recency and access frequency associated with the individual files, and wherein indentifying the candidate file for deletion from the file cache is based, at least in part, on both the indication of access recency and the indication of access frequency of the individual files;
wherein the file-level context information includes a file access pattern of an application under execution on the computing device, and wherein identifying a candidate file for deletion from the file cache, based at least in part on the indication of application-level relationships, further includes eliminating for consideration those individual files that are indicated, by the file access patter, as being accessed after an individual file that was recently accessed by the application.

9. The computer-implemented method of claim 8, wherein implementing includes computing a frequency-recency value (FRV) associated with each individual file to indicate access recency and access frequency, wherein calculating FRV includes calculating a weighted exponentially moving average (WEMA) represented by an equation:

$$FRV_k = \alpha * FRV_{k-1} + (1-\alpha) * \text{sample}$$

where $FRV_k$ represents a new FRV,
$FRV_{k-1}$ represents an immediately preceding FRV,
$\alpha$ represents a weighting decrease value between 0 and 1, and
sample represents a value of 1 for an individual file of the file cache that is currently being accessed or −1 for an individual file of the file cache that is not currently being accessed.

10. The computer-implemented method of claim 8, further comprising: observing, by the file cache manager, file access patterns during execution of one or more applications; and generating the indication of application-level relationships between the individual files based at least in part on the observed file access patterns.

11. The computer-implemented method of claim 8, wherein the file-level context information further includes an indication of file size of the individual files, and wherein identifying the candidate file for deletion from the file cache is based at least in part on the respective file sizes of the individual files.

12. The computer-implemented method of claim 8, wherein the file-level context information further includes an indication of user preference of the individual files, and wherein identifying the candidate file for deletion from the file cache is based at least in part on the user preference of the individual files.

13. The computer-implemented method of claim 8, wherein the file cache is one of:
a disk cache;
a web cache; or
a cloud storage cache.

14. One or more non-transitory computer-readable media having instructions stored thereon which, in response to execution by a computing device, provide the computing device with a file cache manager to:
determine that a file cache of the computing device has reached a threshold of available capacity; and
implement, in response to the determine, a context-aware eviction policy to identify a candidate file for deletion from the file cache based at least in part on file-level context information associated with individual files contained within the cache, wherein the file-level context information includes an indication of access recency and access frequency associated with the individual files, and wherein to identify the candidate file for deletion from the file cache is based, at least in part, on both the indication of access recency and the indication of access frequency of the individual files;
wherein the file-level context information further includes an indication of application-level relationships between the individual files, and wherein the file cache manager is further to identify the candidate file for deletion from the file cache based at least in part on the indication of application-level relationships;
wherein the file-level context information includes a file access pattern of an application under execution on the computing device, and wherein to identify a candidate file for deletion from the file cache, based at least in part on the indication of application-level relationships, the file cache manager is further to eliminate for consideration those individual files that are indicated, by the file access pattern, as being accessed after an individual file that was recently accessed by the application.

15. The non-transitory computer-readable media of claim 14, wherein to implement includes to calculate a frequency-recency value (FRV) associated with each individual file to indicate access recency and access frequency, wherein to calculate includes to calculate the FRV as a weighted exponentially moving average (WEMA) represented by an equation:

$$FRV_k = \alpha * FRV_{k-1} + (1-\alpha) * \text{sample},$$

where $FRV_k$ represents a new FRV,
$FRV_{k-1}$ represents an immediately preceding FRV,
$\alpha$ represents a weighting decrease value between 0 and 1, and sample represents a value of 1 for an individual file of the file cache that is currently accessed or −1 for an individual file of the file cache that is not currently accessed.

16. The non-transitory computer-readable media of claim 14, wherein the file cache manager is to further observe file access patterns during execution of one or more applications; and generate the indication of application-level relationships between the individual files based at least in part on the observed file access patterns.

17. The non-transitory computer-readable media of claim 14, wherein the file-level context information further includes an indication of file size of the individual files, and wherein the file cache manager is further to identify the candidate file for deletion from the file cache based at least in part on the respective file sizes of the individual files.

18. The non-transitory computer-readable media of claim 14, wherein the file-level context information further includes an indication of user preference of the individual files, and wherein the file cache manager is further to identify the candidate file for deletion from the file cache based at least in part on the user preference of the individual files.

19. The non-transitory computer-readable media of claim 14, wherein the file cache is one of:
   a disk cache;
   a web cache; or
   a cloud storage cache.

* * * * *

UNITED STATES PATENT AND TRADEMARK OFFICE
CERTIFICATE OF CORRECTION

PATENT NO. : 9,740,635 B2
APPLICATION NO. : 14/656453
DATED : August 22, 2017
INVENTOR(S) : Ren Wang et al.

It is certified that error appears in the above-identified patent and that said Letters Patent is hereby corrected as shown below:

In the Claims

Column 12
Line 59, "The computing device of device of claim 1,..." should read – The computing device of claim 1,...

Column 13
Line 48, "patter,..." should read – pattern,...

Signed and Sealed this
Seventeenth Day of October, 2017

Joseph Matal
*Performing the Functions and Duties of the
Under Secretary of Commerce for Intellectual Property and
Director of the United States Patent and Trademark Office*